UNITED STATES PATENT OFFICE.

LOUIS HAAS, OF PARIS, FRANCE, ASSIGNOR TO CASSELLA COLOR COMPANY, OF NEW YORK, N. Y.

BLUE SULFUR DYE AND PROCESS OF MAKING SAME.

No. 919,572.  Specification of Letters Patent.  Patented April 27, 1909.

Application filed January 18, 1909. Serial No. 472,911.

*To all whom it may concern:*

Be it known that I, LOUIS HAAS, chemist, a citizen of the Republic of France, and resident of Paris, in the Republic of France, have discovered that by the reaction of nitrosophenol or analogous bodies on carbazol in the presence of concentrated sulfuric acid new products are obtained which on being heated with polysulfids may be transformed into valuable sulfid colors.

The process is illustrated by the following example:

Example: 1 kilo carbazol is dissolved in about 10 kilos sulfuric acid of 66° Bé., into which is introduced a solution of 800 grams of nitrosophenol in about 8 kilos sulfuric acid, while stirring well and taking care that the temperature does not rise above 30° C. The dark blue solution is diluted with ice; the precipitate which has formed, is filtered off and washed and pressed. The thus obtained product represents a bronze like mass. In order to transform the same into the sulfur color, it is stirred up carefully with a little water and heated in an open vessel with 1 to 1.5 kilos crystallized sodium-sulfid, until decoloration is complete. 1 to 1.5 kilos sulfur are then introduced while stirring and the mixture is concentrated by evaporation and kept melted. In this manner a sulfid color is obtained which in an alkaline sulfid bath dyes cotton darkblue shades. The pure coloring matter may be obtained by one of the known methods, for instance dissolving with alkaline sulfids and precipitating by means of a current of air or with acids, etc. The dyestuff so obtained, possesses excellent dyeing properties and is distinguished especially by its intensity, its beautiful shade, and fastness to light and chlorin.

If in the above process the nitrosophenol is substituted by analogous bodies, blue dyestuffs, possessing analogous properties, are obtained.

Having now particularly described and ascertained the nature of my said invention and in what manner the same is to be performed I declare that what I claim is:—

1. The production of fast blue coloring matters by condensing a nitrosophenol with carbazol and heating the products with polysulfids, substantially as described.

2. The new dyestuff which may be obtained by condensing a nitrosophenol with carbazol and heating the product with polysulfids, and which is a dark blue powder soluble in concentrated sulfuric acid with a greenish black color, soluble in water in the presence of alkaline sulfids or reducing agents, and dyeing from such solutions fast blue shades on cotton substantially as described.

The foregoing specification of my new products obtained by the reaction of nitrosophenol or analogous bodies on carbazol in the presence of concentrated sulfuric acid signed by me this 19th day of December 1908.

LOUIS HAAS.

Witnesses:
 DEAN B. MASON,
 MAURICE H. PIGUET.